United States Patent [19]

Yamagata

[11] Patent Number: 4,843,457
[45] Date of Patent: Jun. 27, 1989

[54] DROP-OUT CORRECTING LUMINANCE-CHROMINANCE SIGNAL SEPARATION CIRCUIT

[75] Inventor: Kenji Yamagata, Saitama, Japan

[73] Assignee: Pioneer Electronic Corporation, Tokyo, Japan

[21] Appl. No.: 298,231

[22] Filed: Jan. 9, 1989

Related U.S. Application Data

[63] Continuation of Ser. No. 941,869, Dec. 15, 1986, abandoned.

[30] Foreign Application Priority Data

Dec. 17, 1985 [JP] Japan .................................. 60-284162

[51] Int. Cl.⁴ ........................ H04N 9/78; H04N 9/88
[52] U.S. Cl. ...................................... 358/31; 358/314
[58] Field of Search ................... 358/31, 36, 314, 329

[56] References Cited

U.S. PATENT DOCUMENTS

| | | | |
|---|---|---|---|
| 4,032,966 | 6/1977 | Kenney et al. | 358/36 |
| 4,122,489 | 10/1978 | Bolger et al. | 358/21 R |
| 4,251,831 | 2/1981 | Kamath | 358/21 R |
| 4,376,289 | 3/1983 | Reitmeier et al. | 358/163 |
| 4,464,686 | 8/1984 | Reitmeier | 358/314 |
| 4,470,065 | 9/1984 | Reitmeier | 358/21 R |
| 4,490,748 | 12/1984 | Kamath | 358/314 |
| 4,517,600 | 5/1985 | Reitmeier | 358/166 |
| 4,701,784 | 10/1987 | Matsuoka et al. | 358/213.17 |

Primary Examiner—James J. Groody
Assistant Examiner—Robert M. Bauer
Attorney, Agent, or Firm—Sughrue, Mion, Zinn, Macpeak & Seas

[57] ABSTRACT

A luminance-chrominance signal separation circuit in which only those values of a digitized video signal which do not manifest drop-out are used for producing a luminance and a chrominance signal from linear combinations of the video signals. Different combinations are used depending on the locations of the drop-out.

5 Claims, 4 Drawing Sheets

FIG. 1
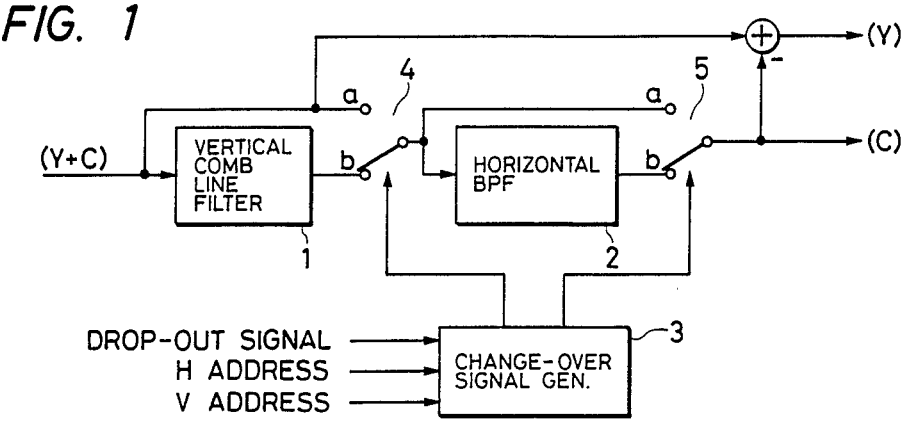
FIG. 2
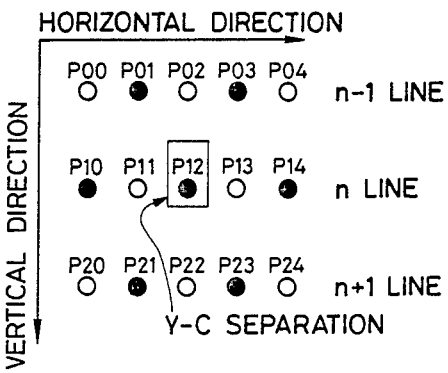
FIG. 4
| | P12 | P02 | P22 | SWITCH 8 | SWITCH 9 |
|---|---|---|---|---|---|
| ① | | / | / | e | |
| ② | / | | DO | d | b |
| ③ | | DO | / | f | |
| ④ | | | DO | x | a |
| ⑤ | | / | / | e | |
| ⑥ | DO | | DO | d | c |
| ⑦ | | DO | / | f | |
| ⑧ | | | DO | x | - |
FIG. 3
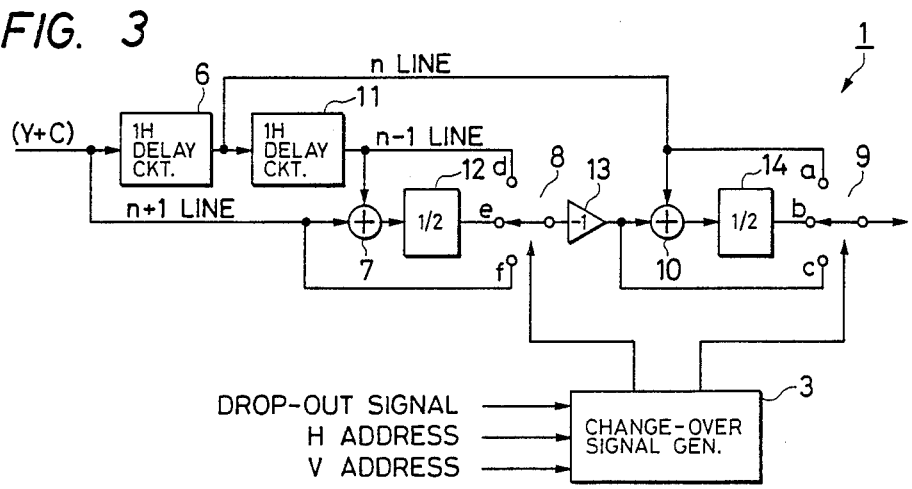

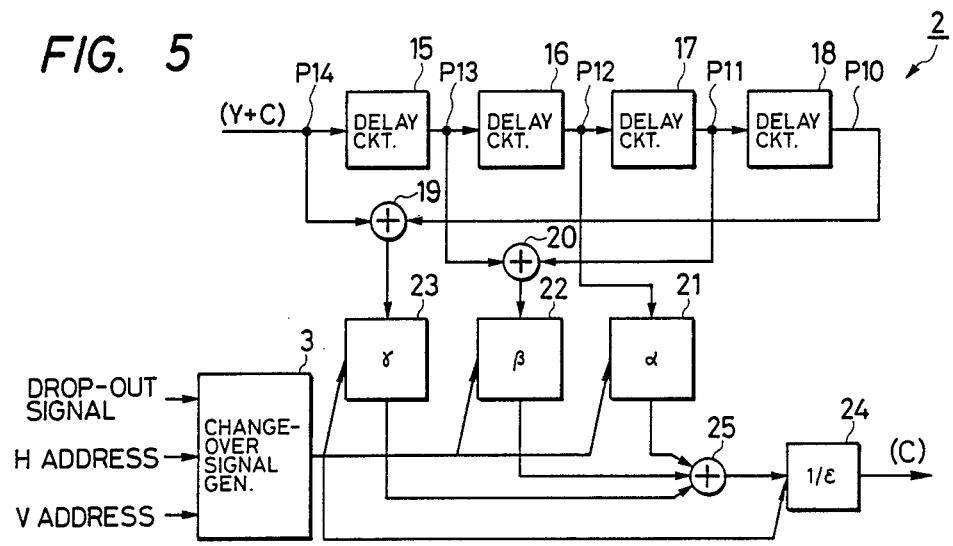

DROP-OUT CORRECTING LUMINANCE-CHROMINANCE SIGNAL SEPARATION CIRCUIT

This is a continuation of application Ser. No. 06/941,869, filed 12/15/85 now abandoned.

BACKGROUND OF THE INVENTION

1. Field of the Invention

The present invention generally relates to a luminance-chrominance signals separation circuit, (hereinafter referred to as a Y-C separation circuit), and particularly relates to a Y-C separation circuit provided in an apparatus for digitally processing a video signal.

2. Background of the Invention

Conventionally, a video signal has been processed generally in an analog manner. In view of integrating the circuitry, or in case of using an integrated circuit, however, it is extremely advantageous to perform signal processing in a digital manner in comparison with that in an analog manner. Further, when signal processing is performed digitally, it is possible to easily realize various functions in the process of signal processing to attain a high picture quality.

In the case where recording/reproducing is carried out, for example, in a video disk player or the like, so-called drop-out compensation is performed in order to compensate the recorded information for a defect due to a scratch generated in the disk and/or dust adhering to the disk. Generally, a dropped-out signal cannot be perfectly restored to its original state even after the signal has been compensated for drop-out. Therefore, when a digitized video signal is separated into a luminance (Y) signal and a chrominance (C) signal, if Y-C separation is carried out with respect to a digitized video signal portion containing the compensated signal, Y-C separation of other digitized video signal portions vertically or horizontally adjacent to the first-mentioned digitized video signal portion may be affected by the imperfection of the compensated signal.

SUMMARY OF THE INVENTION

An object of the present invention is therefore to eliminate the foregoing disadvantages in the prior art.

In particular, an object of the present invention is to provide a Y-C separation circuit in which the influence of drop-out compensation onto Y-C separation is reduced and an external drop-out compensator is not used in the Y-C separation by using only the data values having no drop-out.

In order to attain the above objects, according to an aspect of the invention, the luminance-chrominance signal separation circuit for separating a digitized video signal into a luminance signal and a chrominance signal is featured in that drop-out is detected for every value of data forming the digitized video signal. Those data having correlation with respect to the phase of chrominance components among the data values having no drop-out are combined with each other so as to be separated into the luminance signal and the chrominance signal.

The present invention will be apparent from the following detailed description taken in conjunction with the accompanying drawings.

BRIEF DESCRIPTION OF THE DRAWINGS

FIG. 1 is a block diagram showing an embodiment of the Y-C separation circuit according to the present invention;

FIG. 2 is a diagram showing a part of three horizontal scanning lines adjacent to each other;

FIG. 3 is a block diagram showing the specific arrangement of the vertical comb line filter;

FIG. 4 is a diagram for explaining the operation of the circuit of FIG. 3;

FIG. 5 is a block diagram showing the specific arrangement of the horizontal band pass filter;

FIG. 6 is a diagram for explaining the operation of the circuit of FIG. 5;

DETAILED DESCRIPTION OF THE PREFERRED EMBODIMENTS

Figure 7:
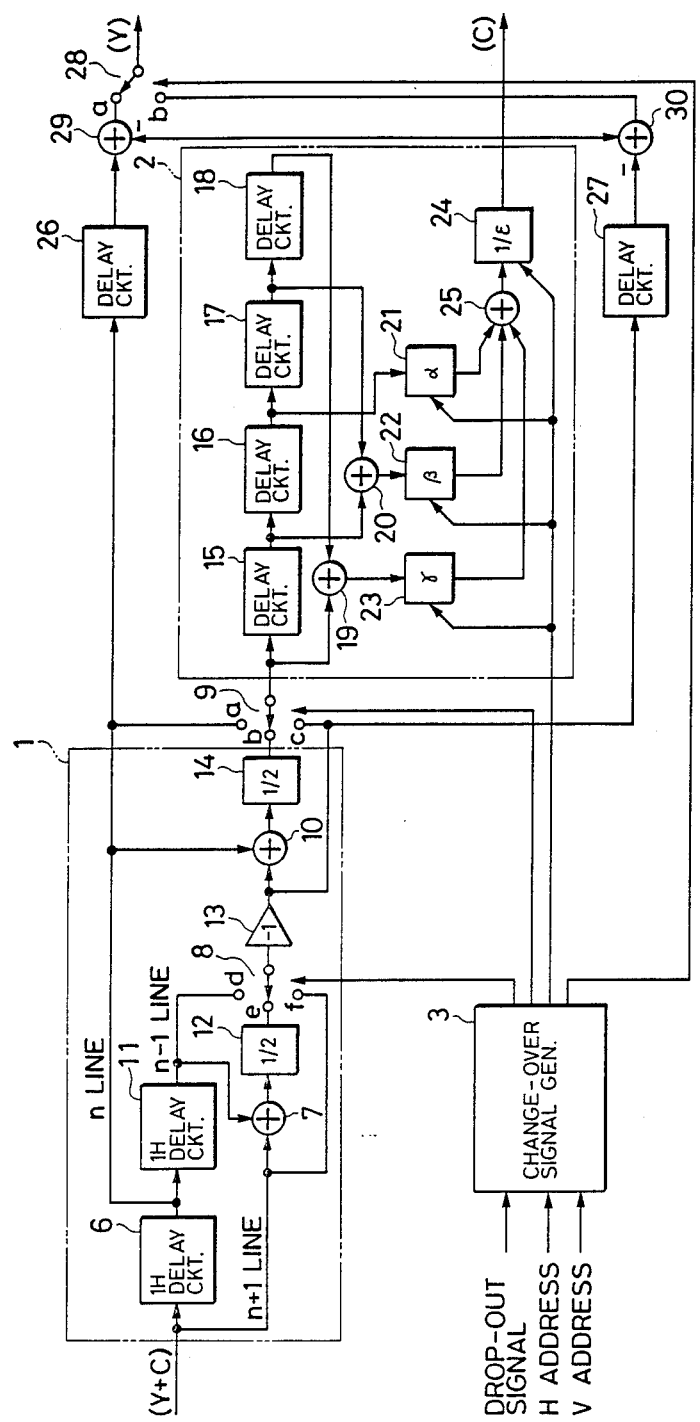
FIG. 7 is a block diagram showing another embodiment of the Y-C separation circuit according to the present invention.

Embodiments of the Y-C (luminance-chrominance) separation circuit according to the present invention will be described in detail with reference to the accompanying drawings hereunder.

FIG. 1 is a block diagram showing an embodiment of the Y-C separation circuit according to the present invention. In the drawing, the Y-C separation circuit is fundamentally constituted by a vertical comb line filter 1 and a horizontal band pass filter 2 (hereinafter referred to as a horizontal BPF), and is arranged such that Y-C separation is performed normally by both the filters 1 and 2. On the other hand, if drop-out occurs in an input signal (a digitized video signal), the connection of change-over switches 4 and 5 is suitably changed-over in response to a change-over signal generated from a change-over signal-generator 3 on the basis of a drop-out detection signal, horizontal (H) address information, and vertical (V) address information. In that case, Y-C separation is performed by using only the vertical comb line filter 1 or the horizontal BPF 2. This Y-C separation will be described in detail hereunder.

FIG. 2 is a diagram showing a part of three horizontal scanning lines adjacent to each other. In the drawing, assume that information representing drop-out is received together with an input signal, and that Y-C separation of a dot $P_{12}$ is carried out. In FIG. 2, the color of black and white dots represents the phase of a chrominance signal. When any one of the dots $P_{02}$, $P_{12}$, and $P_{22}$ in the vertical direction is dropped-out, connection of the change-over switch 4 is changed over to the side a to thereby disable the vertical comb line filter 1. Therefore Y-C separation is performed by using only the horizontal BPF 2. When any one of dots $P_{10}$, $P_{11}$, $P_{12}$, $P_{13}$, and $P_{14}$ in the horizontal direction is dropped out, on the contrary, the connection of the change-over switch 5 is changed-over to the side a to disable the horizontal BPF 2 so that the Y-C separation is performed by using only the vertical comb line filter 1. Further, when the dot $P_{12}$ is dropped out, it is impossible to use both the vertical and horizontal filters 1 and 2, so that the Y-C separation cannot be performed. Consequently, in the thus arranged Y-C separation circuit, it is necessary to receive a signal which has been drop-out compensated in advance by a drop-out compensator. In this case, the Y-C separation is performed by using both the horizontal and vertical filters 1 and 2.

Generally, a dropped-out signal cannot be perfectly restored to its original state even after the signal has been drop-out compensated. If the Y-C separation is performed at such an imperfect signal portion, the imperfection of the compensated signal affects Y-C separation at other signal portions vertically and horizontally adjacent to the firstmentioned drop-out compensated signal portion. However, in this embodiment, the connection is changed over to the vertical comb line filter 1 or the horizontal BPF 2 when drop-out is generated, as described above, so that Y-C separation is performed at the signal portions except the drop-out compensated portion to thereby make it possible to reduce the influence of drop-out compensation onto the Y-C separation.

Although Y-C separation is carried out in such a manner that the connection is changed over between the filters 1 and 2 when drop-out occurs at any portion in an input signal to delete the dropped-out portion in the embodiment described above, it is possible to change-over the internal arrangement of the vertical comb line filter 1 or the horizontal BPF 2. Description will be made next as to the case where the internal arrangement of the filter is changed over.

FIG. 3 is a block diagram showing an example of the arrangement of the vertical comb line filter 1. Although only the chrominance separation is illustrated in FIG. 3, the luminance separation can be performed in the same manner as in the circuit of FIG. 7 which will be described later. In the drawing, a digitized video signal is applied to a 1H (one horizontal period) delay circuit 6, to an adder 7, and to a contact f of a change-over switch 8. The delayed output of the 1H delay circuit 6 is directly applied to a contact a of a change-over switch 9 and to an adder 10, and is applied to a contact d of the change-over switch 8 and the adder 7 through another 1H delay circuit 11. The sum output of the adder 7 is applied to a contact e of the change-over switch 8 after the level of the addition output signal has been reduced to half by a level adjusting circuit 12. The output of the change-over switch 8 is applied to a multiplier 13 having a coefficient of $-1$. The output of the multiplier 13 is applied to the adder 10 and a contact c of the change-over switch 9. The sum output of the adder 10 is applied to a contact b of the change-over switch 9 after a level of the added output signal has been reduced to half by a level adjusting circuit 14. The connection is suitably changed over between the change-over switches 8 and 9 in response to a change-over signal generated from the change-over signal generator 3.

In the thus arranged Y-C separation circuit, assume that Y-C separation is performed at the dot $P_{12}$ of FIG. 2. FIG. 4 shows the relationship between change-over positions of the change-over switches 8 and 9 and drop-out in this case. In the drawing, the reference symbols "/", "DO", and "X" respectively represent the cases where there exists no drop-out, there exists dropout, and it is impossible to perform Y-C separation. When the connection is changed over to the respective contacts b and e of the change-over switches 9 and 8 (no drop-out), a 3-line correlating comb line filter is formed. On the other hand when the connection is changed over to the contact d or f the change-over switch 8 (dropout in $P_{02}$ or $P_{22}$), a 2-line correlating comb line filter is formed, so that vertical Y-C separation is performed. These three cases are summarized in (1) through (3) in FIG. (4).

When the connection is changed over to the contact a or c of the change-over switch 9 (drop-out in both $P_{02}$ and $P_{22}$ or drop-out in the currently processed $P_{12}$ plus drop-out in of $P_{02}$ and $P_{22}$), it is impossible to perform the vertical Y-C separation. Therefore, when both $P_{02}$ and $P_{22}$ have drop-outs, a signal to be sent to the horizontal BPF 2 is selected to directly use a signal on the n-th line [(4) in FIG. 4] by using the change-over switch 9. When $P_{12}$ has a drop-out the signal is selected by using the change-over switch 8 to use any one of an average of signals on the $(n+1)$-th and $(n-1)$-th lines [no drop-out in $P_{02}$ and $P_{22}$, (5) in FIG. 4], a signal on the $(n-1)$-th line [drop-out in $P_{22}$, (6) in FIG. 4], and a signal on the $(n+1)$-th line [drop-out in $P_{02}$, (7) in FIG. 4]. Thereby, a signal is selectively used on the line where no drop-out occurs. This operation is also a kind of drop-out compensation, and therefore it is not necessary to externally perform drop-out compensation in advance.

In the case of (8) in FIG. 4, it is impossible to process signals as they are because all the signals are dropped out. However, there is little possibility that such a state occurs. If there is a possibility of occurrence of such a state, it is possible to cope with such a state by increasing the number of lines used up to three or more. Further, similarly to the foregoing case, it is possible to use the Y-C separation circuit together with a drop-out compensator.

FIG. 5 is a block diagram showing an example of the arrangement of the horizontal BPF 2. In the drawings, a digitized video signal is applied to four states of serially connected delay circuits 15 through 18 on one hand, and added to the delayed output of the fourth delay circuit 18 by an adder 19 on the other hand. The delayed output of the first delay circuit 15 is added to that of the third delay circuit 17 by an adder 20. The delayed output of the second delay circuit 16 is applied to an adder 25 through a multiplier 21 having a multiplying coefficient $\alpha$. The respective added outputs of the adders 20 and 19 are applied to an adder 25 respectively through multipliers 22 and 23 having respective multiplying coefficient $\beta$ and $\}$. The added output of the adder 25 becomes a chrominance (C) output after the level thereof has been adjusted through a multiplier 24 having a multiplying coefficient $1/\epsilon$. The respective multiplying coefficients of the multipliers 21 through 24 are changed in response to a change-over signal generated from the change-over signal generator 3.

In the thus arranged Y-C separation circuit, a phase linear non-cyclic digital filter is formed, and therefore the multiplying coefficients are made symmetrical with respect to a center of the states of delay circuits. A sampling frequency is selected to be 4 $f_{sc}$ ($f_{sc}=3.58$ MHZ), and the quantity of delay D of each of the delay circuits 15 through 18 corresponds to the quantity of delay for two clock periods $[D=1/(2f_{sc})]$. The multiplier 24 is provided for making input and output levels coincident with each other, and the following expression is established $$\epsilon = 2(|\beta|+|\gamma|)+\alpha, \text{ where } \alpha > 0$$

Assume now that Y-C separation is performed at the dot $P_{12}$ of FIG. 2. FIG. 6 shows the relationship between the multiplying coefficients of the multipliers and drop-out in this case. In the drawings, the reference symbols "/" and "DO" respectively represent the cases where there exists no drop-out and there exists drop-out. It is found from FIG. 6 that each of the multiplying coefficients is changed to form a filter so as not to use any dropped-out dot.

It is impossible to sufficiently change the internal arrangement of the filter or to perform signal separation by using such a low order filter as used in this example, and therefore a high order filter is used in practice.

The Y-C separation circuit described above either changes over the connection of the filter or changes over the internal arrangement of the filter for deleting a dropped-out portion when drop-out is generated in an input signal. However, it is possible to combine these two methods with each other. FIG. 7 shows the arrangement of a circuit in this case. In the drawings, the quantity of delay of each of two additional delay circuits 26 and 27 is made equal to that of the horizontal BPF 2. When the change-over switch 9 is connected to the contact a or b, a change-over switch 28 is connected to its contact d to thereby select an output of a subtracter 29. On the other hand, when the change-over switch 9 is connected to the contact c, the change-over switch 28 is connected to its contact e to thereby select the output of a subtracter 30, so that a luminance (Y) signal is separated. In this circuit, the foregoing operation contains a function for compensating for drop-out similarly to the circuit of FIG. 3, and it is possible to reduce the influence of drop-out on Y-C separation to the utmost.

Figure 8:
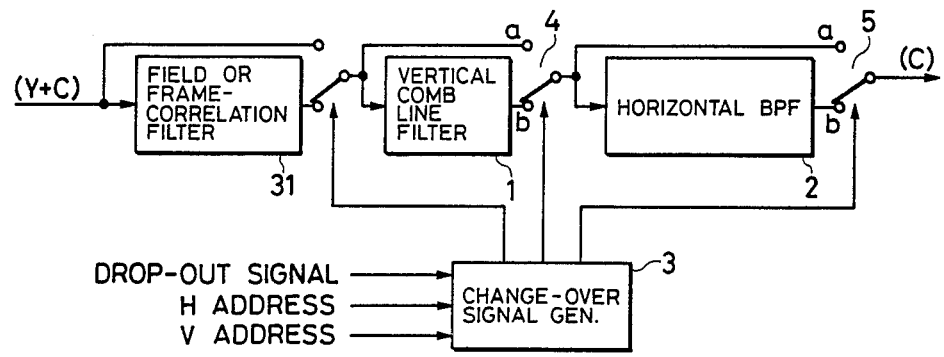
FIG. 8 is a block diagram showing a further embodiment according to the present invention.

Further, description has been made as to the case where change-over is performed in two dimensions, that is in the horizontal and vertical directions in the foregoing embodiment. However, if a frame memory is provided, it is possible to perform separation by a field- or frame-correlation filter 31 shown in FIG. 8 and change-over in three dimensions.

Further, it is possible to change-over the internal arrangement of the field- or frame correlation filter 31.

Further, the arrangement of the Y-C separation circuit is not limited to those shown in the foregoing embodiments, but various modifications can be made onto the embodiments. In short, the Y-C separation circuit according to the present invention may be arranged so long as drop-out can be detected for every value of data forming a digitized video signal and values of data having correlation between phases of components representing chrominance information can be combined with each other among those of non-dropped-out data. Next, the principle of the Y-C separation will be explained by using general expressions.

Figure 9:
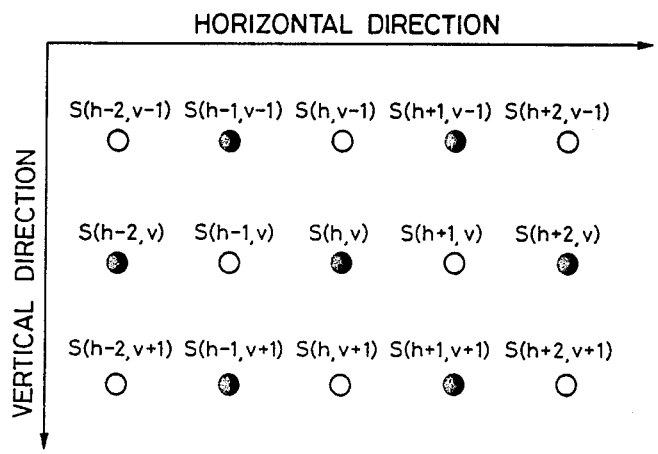
FIG. 9 is a diagram showing a part of three horizontal scanning lines adjacent to each other and for explaining a principle of Y-C separation by general expressions.

As shown in FIG. 9, when a digitized video signal and a luminance signal, and a chrominance signal are respectively represented by $S(X, Y)$, $Y(X, Y)$, and $C(X, Y)$, the following expressions are generally established.

$$S(X, Y) = Y(X, Y) + C(X, Y)$$

$$Y(X, Y) \simeq Y(X, Y-1) \simeq Y(X, Y+1)$$

$$C(X, Y) \simeq -C(X, Y-1) \simeq -C(X, Y+1)$$

These equations show the luminance signals X and the chrominance signals C which have a fixed phase correlation between the respective signals. The Y-C separation can be attained by extracting a chrominance component out of the digitized video signal S through filtering and by subtracting the chrominance component from the digitized video signal S. When the separated chrominance and luminance components are represented by $C^*$ and $Y^*$ respectively, the chrominance component $C^*$ is represented in a space region by convoluting a transfer function H (summing over transfer indices 1 and m) corresponding to the filter with the digitized video signal S.

$$C^*(h, v) = \Sigma_l \Sigma_m H(h-l, v-m) \cdot S(l, m)$$

where $\Sigma\Sigma |H| = 1$

At this time, the luminance component $Y^*$ is expressed as follows.

$$Y^*(h, v) = S(h, v) - C^*(h, v)$$

When the transfer function H is represented by the product of a horizontal component $H_h$ and a vertical component $H_v$, that is $H = H_h \cdot H_v$, the following expression is established.

$$C^*(h, v) = \Sigma_l H_h(h-l) \cdot \Sigma_m H_v(v-m) \cdot S(l,m)$$

Here, the portion $\Sigma_l$ corresponds to the vertical filter (see FIG. 3) and, on the other hand, the portion $\Sigma_m$ corresponds to the horizontal filter (see FIG. 5).

$$
\begin{aligned}
C^*(h,v) = &\ \Sigma H(h-1) \cdot [H_v(0) \cdot S(l,v) +\\
&\ H_v(-1) \cdot S(l,v+1) +\\
&\ H_v(1) \cdot S(l,v-1)]\\
= &\ H(O) \cdot [H_v(O) \cdot S(h,v) + H_v(-1) \cdot S(h,v+1) +\\
&\ H_v(1) \cdot S(h,v-1)] +\\
&\ H(-1) \cdot [H_v(O) \cdot S(h+1,v) + H_v(-1) \cdot S(h+1,v+1) +\\
&\ H_v(1) \cdot S(h+1,v-1)] +\\
&\ H(1) \cdot [H_v(O) \cdot S(h-1,v) + H_v(-1) \cdot S(h-1,v+1) +\\
&\ H_v(1) \cdot S(h-1,v-1)]\\
&\ H(-2) \cdot [H_v(O) \cdot S(h+2,v) + H_v(-1) \cdot S(h+2,v+1) +\\
&\ H_v(1) \cdot S(h+2,v-1)] +\\
&\ H(2) \cdot [H_v(O) \cdot S(h-2,v) + H_v(-1) \cdot S(h-2,v+1) +\\
&\ H_v(1) \cdot S(h-1,v-1)] +\\
&\ H(-2) \cdot [H_v(O) \cdot S(h+2,v) + H_v(-1) \cdot S(h+2,v+1) +\\
&\ H_v(1) \cdot S(h-2,v-1)]\\
= &\ H(0,0) \cdot S(h,v) + H(0-1) \cdot S(h,v+1) +\\
&\ H(0,1) \cdot S(h,v-1) + H(-1,0) \cdot S(h+1,v) +\\
&\ H(-1,-1) \cdot S(h+1,v+1) + H(-1,1) \cdot S(h+1,v-1) +\\
&\ H(1,0) \cdot S(h-1,v) + H(l,-1) \cdot S(h-1,v+1) +\\
&\ H(1,1) \cdot S(h-1,v-1) + H(-2,0) \cdot S(h+2,v) +\\
&\ H(-2,-1) \cdot S(h+2,v+1) + H(-2,1) \cdot S(h+2,v-1) +\\
&\ H(2,0) \cdot S(h-2,v) + H(2,-1) \cdot S(h-2,v+1) +\\
&\ H(2,1) \cdot S(h-2,v-1)
\end{aligned}
$$

The values of $H_v$ corresponding to the table of FIG. 4 are as follows in descending order:

| | | |
|---|---|---|
| (1) | $H_v(0) = \frac{1}{2}$ | $H_v(1) = \frac{1}{4}$ |
|     | $H_v(-1) = -\frac{1}{4}$ | Others: zero |
| (2) | $H_v(0) = \frac{1}{2}$ | $H_v(1) = -\frac{1}{2}$ |
|     | $H_v(-1) = 0$ | Others: zero |
| (3) | $H_v(0) = \frac{1}{2}$ | $H_v(1) = 0$ |
|     | $H_v(-1) = -\frac{1}{2}$ | Others: zero |
| (4) | $H_v(0) = 1$ | $H_v(1) = 0$ |
|     | $H_v(-1) = 0$ | Others: zero |
| (5) | $H_v(0) = \frac{1}{2}$ | $H_v(1) = -\frac{1}{2}$ |
|     | $H_v(-1) = -\frac{1}{2}$ | Others: zero |
| (6) | $H_v(0) = 0$ | $H_v(1) = -1$ |
|     | $H_v(-1) = 0$ | Others: zero |
| (7) | $H_v(0) = 0$ | $H_v(1) = 0$ |
|     | $H_v(-1) = -1$ | Others: zero |

The values of $H_h$ corresponding to the table of FIG. 6 are as follows in descending order:

| | | | |
|---|---|---|---|
| (1) | $H_h(0) = \frac{3}{8}$ | $H_h(1) = -\frac{1}{4}$ | $H_h(-1) = -\frac{1}{4}$ |
|     | $H_h(2) = 1/16$ | $H_h(-2) = 1/16$ | Others: zero |
| (2) | $H_h(0) = \frac{1}{2}$ | $H_h(1) = -\frac{1}{4}$ | $H_h(-1) = -\frac{1}{4}$ |
|     | $H_h(2) = 0$ | $H_h(-2) = 0$ | Others: zero |
| (3) | $H_h(0) = 1$ | $H_h(1) = 0$ | $H_h(-1) = 0$ |
|     | $H_h(2) = 0$ | $H_h(-2) = 0$ | Others: zero |
| (4) | $H_h(0) = 0$ | $H_h(1) = -\frac{1}{4}$ | $H_h(-1) = \frac{1}{4}$ |
|     | $H_h(2) = \frac{1}{4}$ | $H_h(-2) = \frac{1}{4}$ | Others: zero |
| (5) | $H_h(0) = \frac{3}{8}$ | $H_h(1) = -\frac{1}{4}$ | $H_h(-1) = -\frac{1}{4}$ |
|     | $H_h(2) = 1/16$ | $H_h(-2) = 1/16$ | Others: zero |

It is seen in this example that different order filters are used in the vertical and horizontal directions. As described above, in the Y-C separation circuit according to the present invention, drop-out is detected for every value of data forming a digitized video signal, and those having correlation with respect to the phase of chrominance component among the data values having no drop-out are combined with each other so as to be separated into a luminance signal and a chrominance signal. Accordingly, it is possible to reduce the influence of the drop-out onto Y-C separation.

What is claimed is:

1. A luminance-chrominance signal separation circuit for separating a digitized video signal into a luminance signal and chrominance signal, in which a possible drop-out is detected for every sample of data forming said digitized video signal and a drop-out detection signal is produced for each of said samples for which a drop-out is detected, comprising:
   means for selecting those data samples of said digitized video signal having a phase correlated to the chrominance components of said digitized video signal and for which no drop-outs have been detected; and
   means for linearly combining said selected data samples to produce a luminance signal and a chrominance signal separated from each other, said combining means operating in response to said drop-out detection signals for said data samples;
   wherein said data samples of said digitized video signal are arranged in a two-dimensional matrix;
   wherein said combining means multiplies a plurality of said data samples occurring over two dimensions of said matrix by corresponding coefficients to obtain respective products and adds said products; and
   wherein said selecting means selects values of said coefficients dependent on said drop-out detection signals.

2. A luminance-chrominance signal separation circuit for separating a digitized video signal into a luminance signal and chrominance signal, in which a possible drop-out is detected for every sample of data forming said digitized video signal and a drop-out detection signal is produced for each of said samples for which a drop-out is detected, comprising:

means for selecting those data samples of said digitized video signal having a phase correlated to the chrominance components of said digitized video signal and for which no drop-outs have been detected; and means for linearly combining said selected data samples to produce a luminance signal and a chrominance signal separated from each other, said combining means operating in response to said drop-out detection signals for said data samples;

wherein said combining means comprises a vertical comb line filter receiving said digitized video signal and a horizontal band pass filter receiving an output of said comb line filter; and wherein said selecting means controls said comb line filter and said band pass filter.

3. A luminance-chrominance signal separation circuit as recited in claim 2, wherein said selecting means changes an internal arrangement of said comb line filter.

4. A luminance-chrominance signal separation circuit as recited in claim 2, wherein said selecting means changes a connection between said comb line filter and said band pass filter.

5. A method of separating a digitized video signal into a luminance and a chrominance signal comprising the steps of:

providing a drop-out detection signal for every sample of data of a digitized video signal in which a drop-out is detected;

selecting those of said data samples having a phase correlated to the chrominance components of said digitized video signal and in which drop-out is not indicated by the respective drop-out detection signal; and linearly combining said selected data samples in a manner responsive to the drop-out detection signals of said data samples not so selected so as to produce a luminance signal and a chrominance signal separated from each other;

wherein said data samples of said digitized video signal are arranged in a two-dimensional matrix;

wherein said combining step comprises multiplying a plurality of said data samples occurring over two dimensions of said matrix by corresponding coefficients to obtain respective products and adding said products; and wherein said selecting step selects values of said coefficients dependent on said drop-out detection signals.

\* \* \* \* \*